(12) United States Patent
Ouchi et al.

(10) Patent No.: US 10,232,825 B2
(45) Date of Patent: Mar. 19, 2019

(54) WIPER ARM

(71) Applicant: NIPPON WIPER BLADE CO., LTD., Saitama (JP)

(72) Inventors: Katsuhiro Ouchi, Saitama (JP); Daiki Kikuchi, Saitama (JP)

(73) Assignee: Nippon Wiper Blade Co., Ltd., Kazo-Shi, Saitama (JP)

( * ) Notice: Subject to any disclaimer, the term of this patent is extended or adjusted under 35 U.S.C. 154(b) by 0 days.

(21) Appl. No.: 15/526,635

(22) PCT Filed: Nov. 11, 2015

(86) PCT No.: PCT/JP2015/081760
§ 371 (c)(1),
(2) Date: May 12, 2017

(87) PCT Pub. No.: WO2016/076366
PCT Pub. Date: May 19, 2016

(65) Prior Publication Data
US 2017/0320467 A1    Nov. 9, 2017

(30) Foreign Application Priority Data

Nov. 14, 2014  (JP) .................................. 2014-232246

(51) Int. Cl.
*B60S 1/34*    (2006.01)
(52) U.S. Cl.
CPC ........... *B60S 1/3481* (2013.01); *B60S 1/3436* (2013.01); *B60S 1/3459* (2013.01)
(58) Field of Classification Search
CPC .... B60S 1/3461; B60S 1/3459; B60S 1/3481; B60S 1/3436; B60S 1/3484; B60S 1/345
(Continued)

(56) References Cited

U.S. PATENT DOCUMENTS

2002/0152575 A1* 10/2002 Tsukamoto ........... B60S 1/3481
15/250.352
2014/0182076 A1* 7/2014 Moll ..................... B60S 1/3481
15/250.351

FOREIGN PATENT DOCUMENTS

DE  2637126  * 2/1977
DE  3532848  * 1/1987
JP  4391965  * 12/2009

OTHER PUBLICATIONS

Machine translation of description portion of German publication 2637126, published Feb. 1977.*

(Continued)

*Primary Examiner* — Gary K. Graham
(74) *Attorney, Agent, or Firm* — Muncy, Geissler, Olds & Lowe, P.C.

(57) ABSTRACT

A wiper arm including an arm head having an arm head body and cover member. The cover member is attached to the arm head body and can open and close. The mechanical strength of the arm head can be increased. The arm head includes a head cap which is rotatably attached to rotating shafts and provided on the inner side surfaces of both side sidewalls of an arm head body. When the head cap is in its closed position, a front-side half section of the head cap is disposed between both side sidewalls. On the rear surface of a rear-side half section of the head cap, a cylindrical cap-side fitting section is provided and fits with a nut disposed on the arm head body. The cap-side fitting section includes slits and is formed so that the height in its vertical direction decreases in a front-side portion.

4 Claims, 11 Drawing Sheets

(58) Field of Classification Search
USPC .................................................. 15/250.34
See application file for complete search history.

(56) References Cited

OTHER PUBLICATIONS

Machine translation of description portion of German publication 3532848, published Jan. 1987.*

* cited by examiner

WIPER ARM

TECHNICAL FIELD

The present invention relates to a wiper arm including an arm head comprising an arm head body and a cover member.

BACKGROUND ART

A wiper arm provided in a wiper device generally includes an arm head linked to a driving means and a retainer supporting a wiper blade and is configured by rotatably coupling the retainer to the arm head. Such an arm head is often composed of an arm head body coupled to the driving means and a cover member attached to the arm head body. With this construction, when a driving shaft of the driving means is fixed to the arm head body by a fixing member such as a nut, the fixing member can be hidden by the cover member.

CITATION LIST

Patent Literature

Patent Literature 1: Japanese Laid-Open Patent Application No. 2000-95070
Patent Literature 2: Japanese Laid-Open Patent Application No. 2003-11787
Patent Literature 3: Japanese Patent No. 2998059

SUMMARY OF INVENTION

Technical Problem

However, when the arm head is composed of the arm head body and the cover member in this way, there is a problem in that mechanical strength (rigidity) of the arm head is deteriorated in a portion where the cover member is disposed.

For example, in a wiper arm disclosed in Japanese Patent Application Laid-Open No. 2003-11787, taking into account efficiency and the like in a manufacturing process of the wiper arm, a cover member (a cap 20) is rotatably coupled to an arm head body (a fixed section 40). As a result, a coupling section of the cap 20 to the fixed section 40 is configured to be disposed on a side surface of the arm head. Therefore, the mechanical strength of the arm head is deteriorated in this portion.

In view of the foregoing, it is an object of the present invention to provide a wiper arm including an arm head comprising an arm head body and a cover member, wherein the cover member is attached to the arm head body and is capable of opening and closing, and wherein the mechanical strength of the arm head can be increased.

Solution to Problem

The present invention is a wiper arm including an arm head linked to driving means,
said arm head including an arm head body and a cover member attached to said arm head body rotatable around a rotating shaft between its open position and its closed position, said arm head body including sidewalls on both sides, wherein at least a part of said cover member is disposed between the sidewalls of said arm head body when said cover member is in its closed position.

Said rotating shaft may be provided on each of inner side surfaces of the sidewalls.

The wiper arm may include a cover member-side fitting section disposed on a rear surface of said cover member and an arm-head-body-side fitting section disposed on said arm head body side, and when said cover member is in its closed position, said cover member-side fitting section and said arm-head-body-side fitting section may fit with each other so that said cover member is fixed to said arm head body.

Said arm-head-body-side fitting section may be a fixing member for fixing a driving shaft of said driving means to said arm head body.

Said cover member-side fitting section may have a cylindrical shape, and slits extending over the entire length of the cylindrical shape may be formed in said cover member-side fitting section.

Said cover member-side fitting section may extend downward from the cover member, and wherein the longitudinal length of said cover member-side fitting section is shorten on the rotating shaft side.

Advantageous Effects of Invention

According to the present invention, in the arm head (e.g., arm head 4) of the wiper arm (e.g., wiper arm 2), the cover member (e.g., head cap 20) is attached to the rotating shafts (e.g., rotating shafts 15A, 15B) provided on the inner side surfaces of the sidewalls (e.g., sidewalls 12A, 12B) on both sides of the arm head body (e.g., arm head body 10). The cover member is thus attached to the arm head body to be capable of rotating between its open position and its closed position. When the cover member is in its closed position, at least a part (e.g., front-side half section 21) of the cover member is disposed between the sidewalls on both sides of the arm head body. Therefore, at least a part of the side surface of the arm head can be configured by the sidewalls of the arm head body having large mechanical strength so that the mechanical strength of the arm head is increased and the durability of the wiper arm is improved. In addition, compared with a cover member covering the entire of the side surface of the arm head, the lateral width of the arm head can be reduced. The cover member can also be easily opened and closed without being detached from the arm head body 10. Therefore, in manufacturing, the arm head body and the cover member can be treated as one member in which the arm head body and the cover member are combined. Accordingly, works on the inside portion of the cover member is easily carried out by opening and closing the cover member.

The wiper arm includes the cover member-side fitting section (e.g., cap-side fitting section 26) on the rear surface of the cover member so that the fixing of the cover member to the arm head body is performed by the fitting of the cover member-side fitting section and the arm-head-body-side fitting section (e.g., nut 9). The cover member-side fitting section is formed in the cylindrical shape and includes the slits (e.g., slits 27A, 27B and 27C) extending over the entire length of the cylindrical shape so that the cap-side fitting section can be expanded during the fitting of the arm-head-side fitting section in the cap-side fitting section. Accordingly, it is possible to smoothly perform the fitting of the arm-head-side fitting section in the cap-side fitting section.

The cover member-side fitting section is extended downward from the cover member. The length in the vertical direction of the cover member-side fitting section is decreased on the rotating shafts side. Accordingly, when opening and closing the cover member, it is possible to fit the cover member-side fitting section and the arm-head-body-side fitting section with each other without the portion on the rotating shafts side of the cover member-side fitting section interfering with the arm-head-body-side fitting section. Therefore, while the cover member is surely fixed to the arm head body by the fitting of the cover member-side fitting section and the arm-head-side fitting section, it is possible to smoothly perform an opening and closing motion of the cover member.

DESCRIPTION OF EMBODIMENTS

The present invention will now be described, by way of example, with reference to the accompanying drawings.

Figure 1:
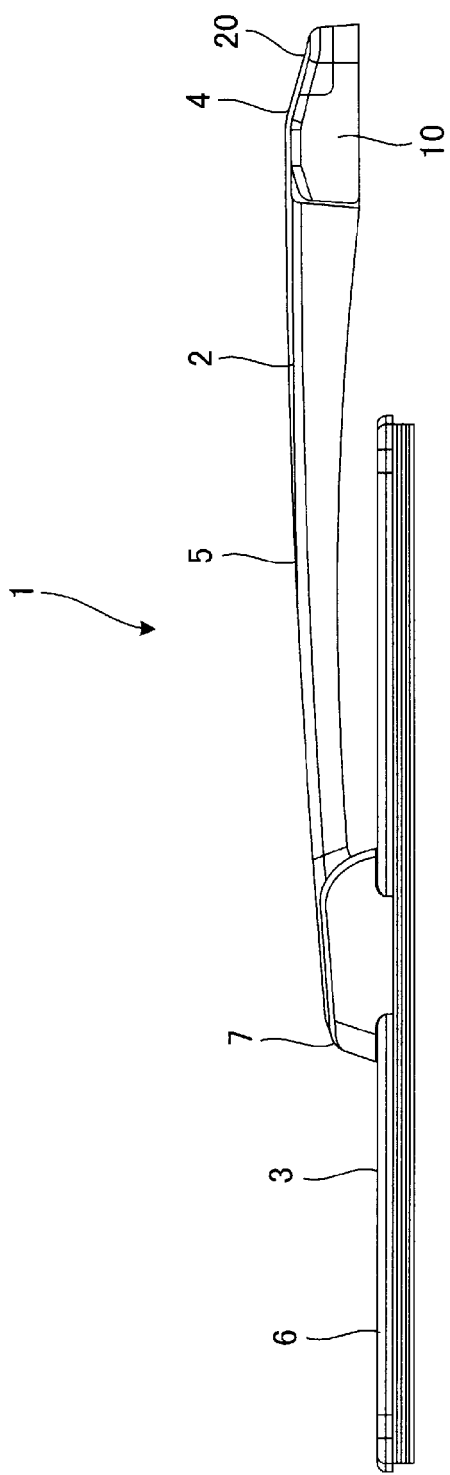
FIG. 1 is a front view showing an overall configuration of a wiper assembly including a wiper arm in an embodiment of the present invention.
Figure 2:
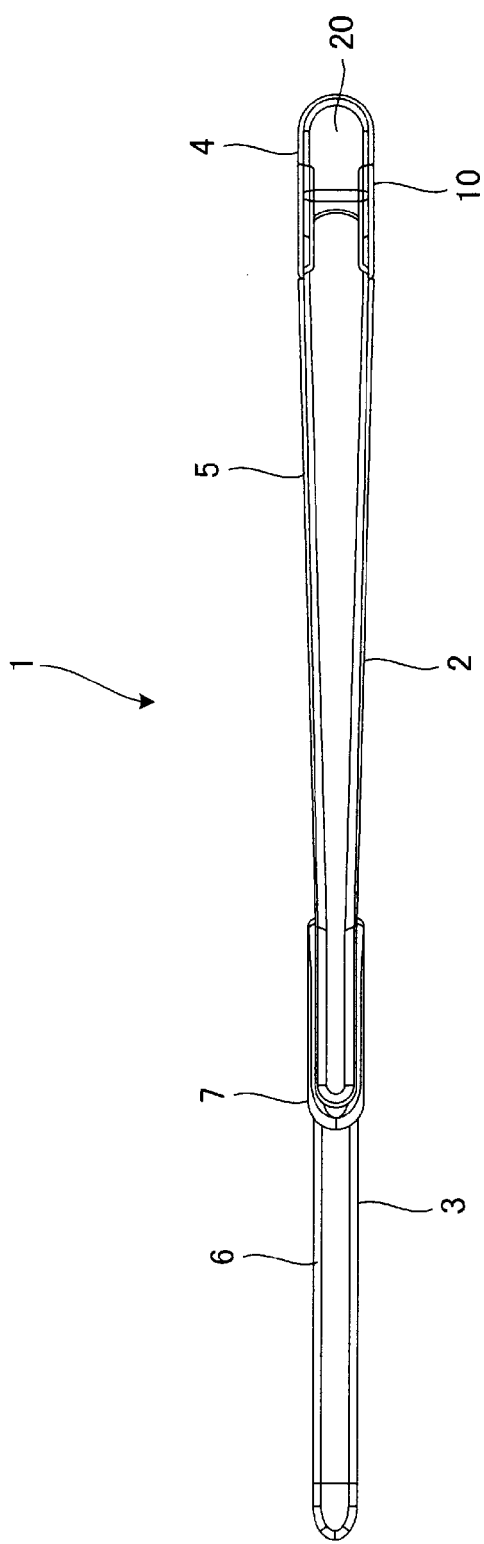
FIG. 2 is a plan view showing the overall configuration of the wiper assembly including the wiper arm in the embodiment.

FIGS. 1 and 2 show an overall configuration of a wiper assembly 1 including a wiper arm 2 of an embodiment of the present invention. As shown in the drawings, the wiper assembly 1 includes a wiper arm 2 and a wiper blade 3 supported by the wiper arm 2.

The wiper arm 2 includes an arm head 4 and a retainer 5. The arm head 4 is a portion linked to not-shown driving means and is disposed on the proximal end side of the wiper arm 2. The retainer 5 is rotatably attached to the arm head 4 in the proximal end portion of the retainer 5. The retainer 5 supports the wiper blade 3 in the distal end portion of the retainer 5.

The wiper blade 3 includes a wiper blade body 6 and a coupling section 7. The wiper blade body 6 is an elongated member made from rubber for wiping a surface to be wiped such as a glass surface of an automobile. The coupling section 7 is provided above substantially the center in the longitudinal direction of the wiper blade body 6. The wiper blade 3 is rotatably coupled to the distal end portion of the retainer 5 in the coupling section 7.

Figure 3:
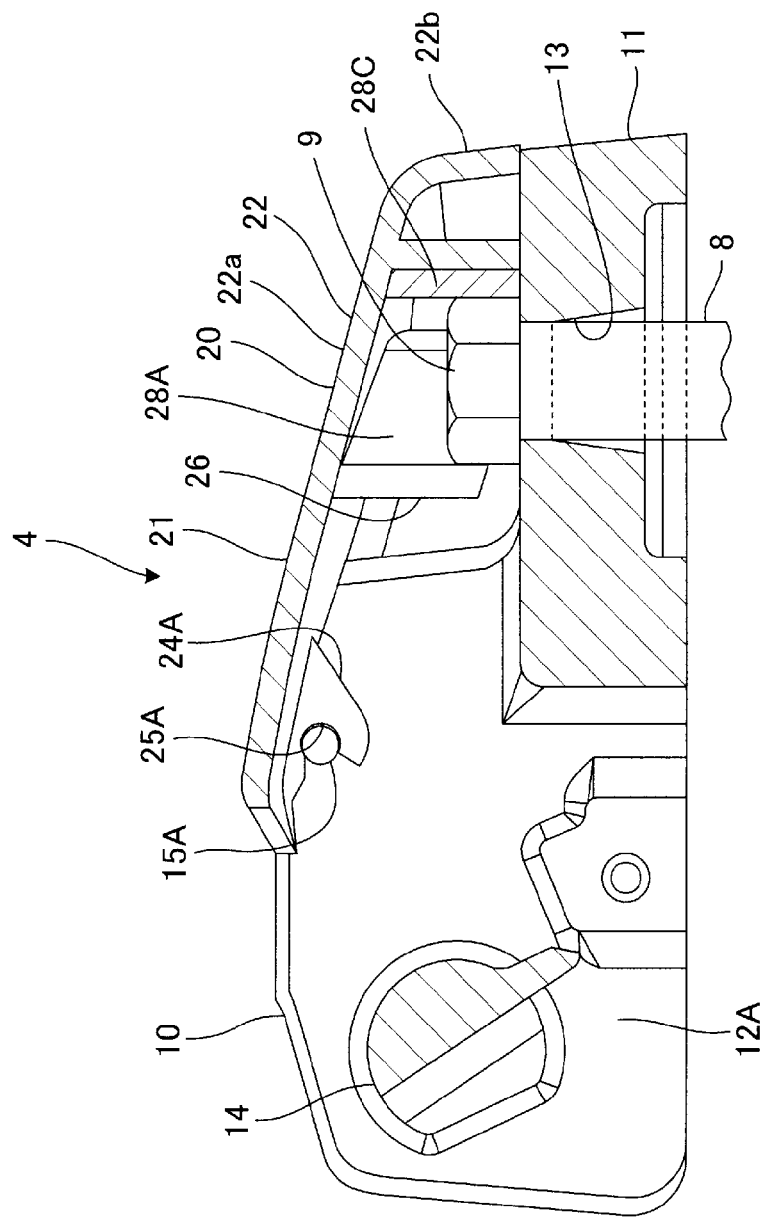
FIG. 3 is a sectional view showing an arm head portion of the wiper arm in the embodiment and shows a state in which a head cap is present in a closed position.
Figure 4:
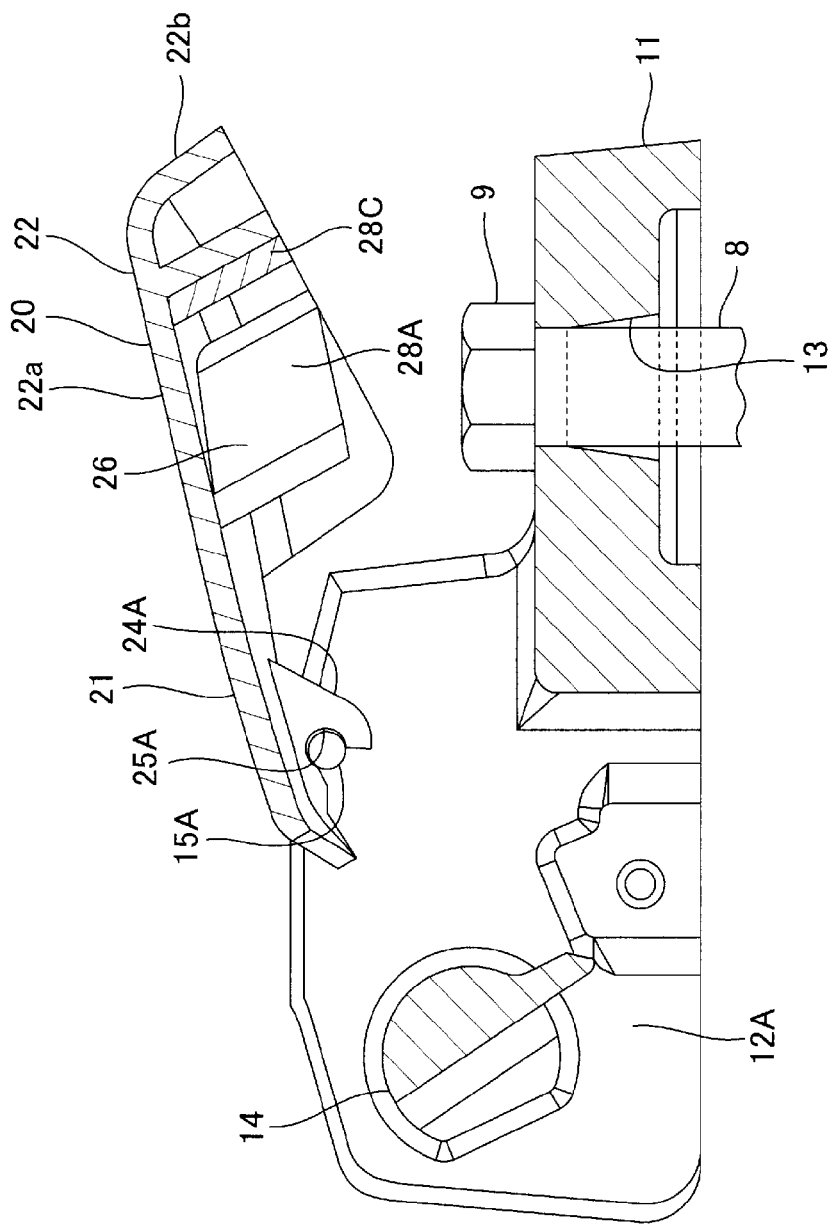
FIG. 4 is a sectional view showing the arm head of the wiper arm in the embodiment and shows a state in which the head cap is present in an open position.
Figure 5:
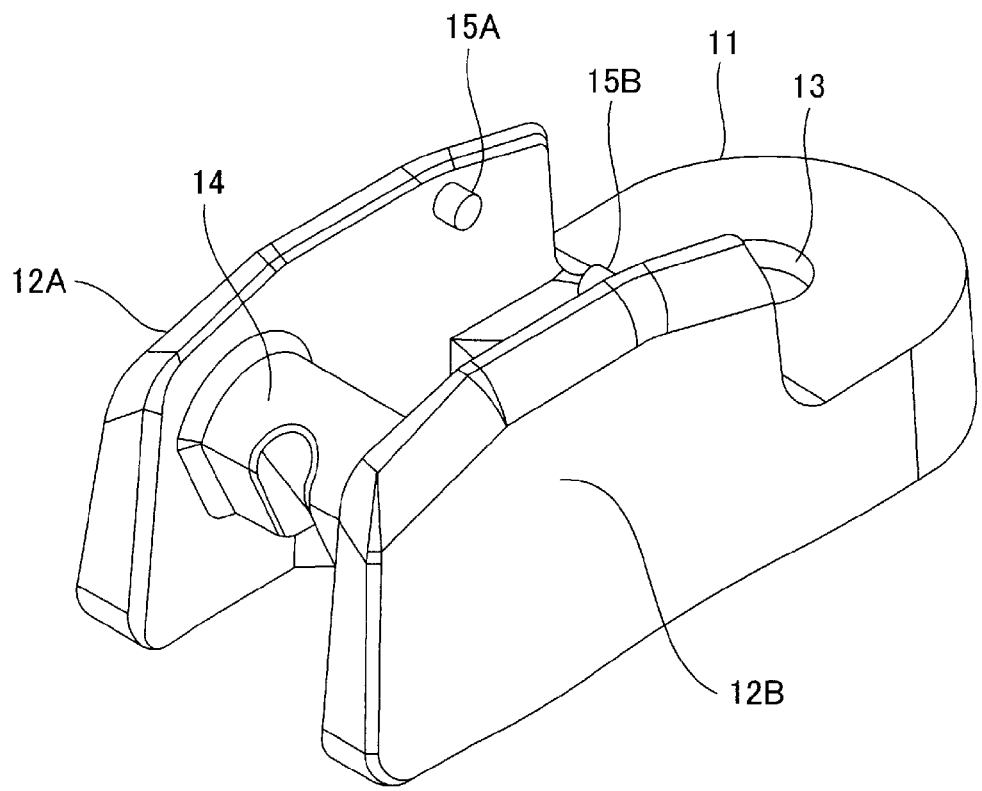
FIG. 5 is a perspective view showing an arm head body in the embodiment.

FIGS. 3 and 4 show a sectional view of the arm head 4. As shown in the drawings, the arm head 4 is configured from an arm head body 10 and a head cap 20. In this embodiment, both of the arm head body 10 and the head cap 20 are formed by integral molding of resin.

Figure 6:
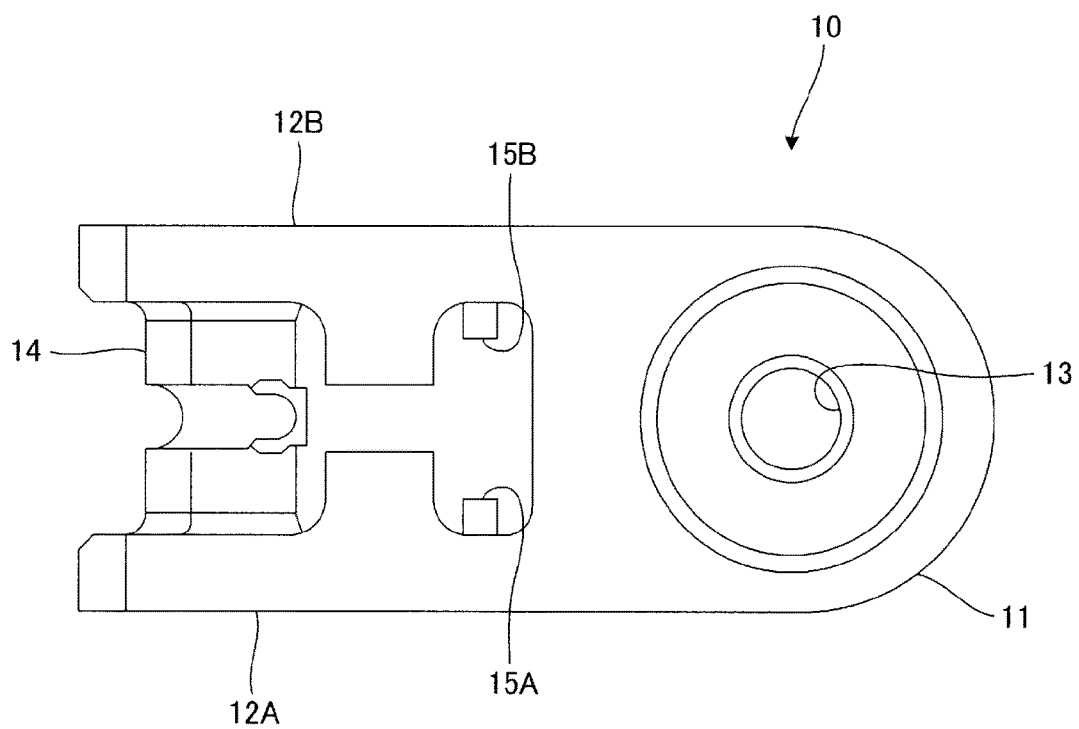
FIG. 6 is a bottom view showing the arm head body in the embodiment.
Figure 7:
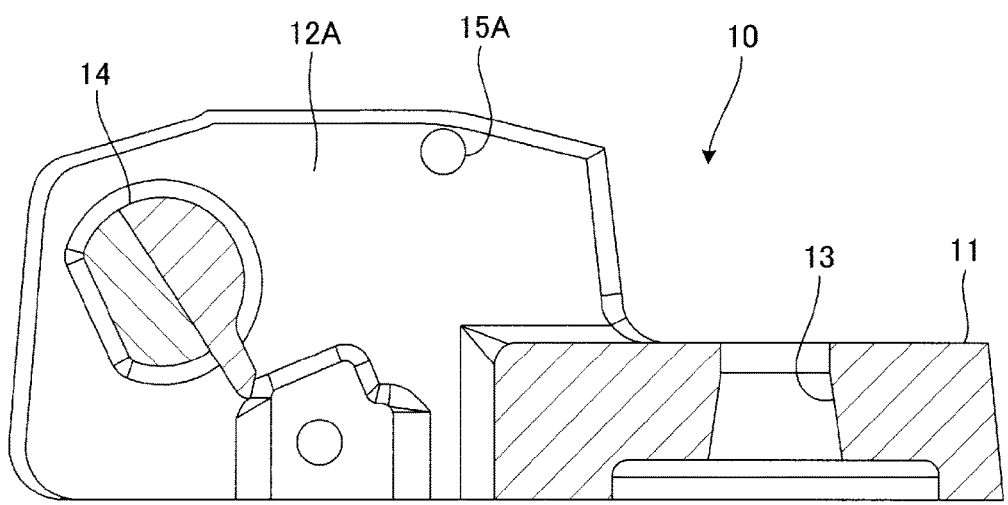
FIG. 7 is a side sectional view showing the arm head body in the embodiment.
Figure 8:
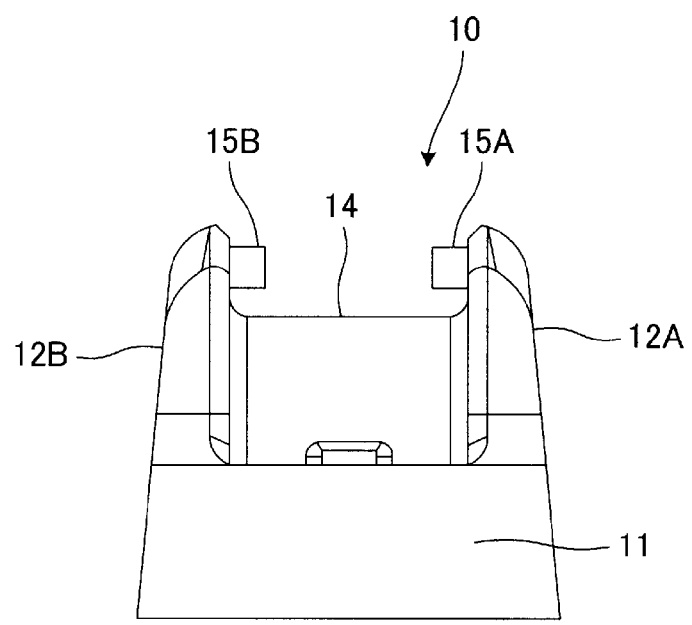
FIG. 8 is a rear view showing the arm head body in the embodiment.
Figure 9:
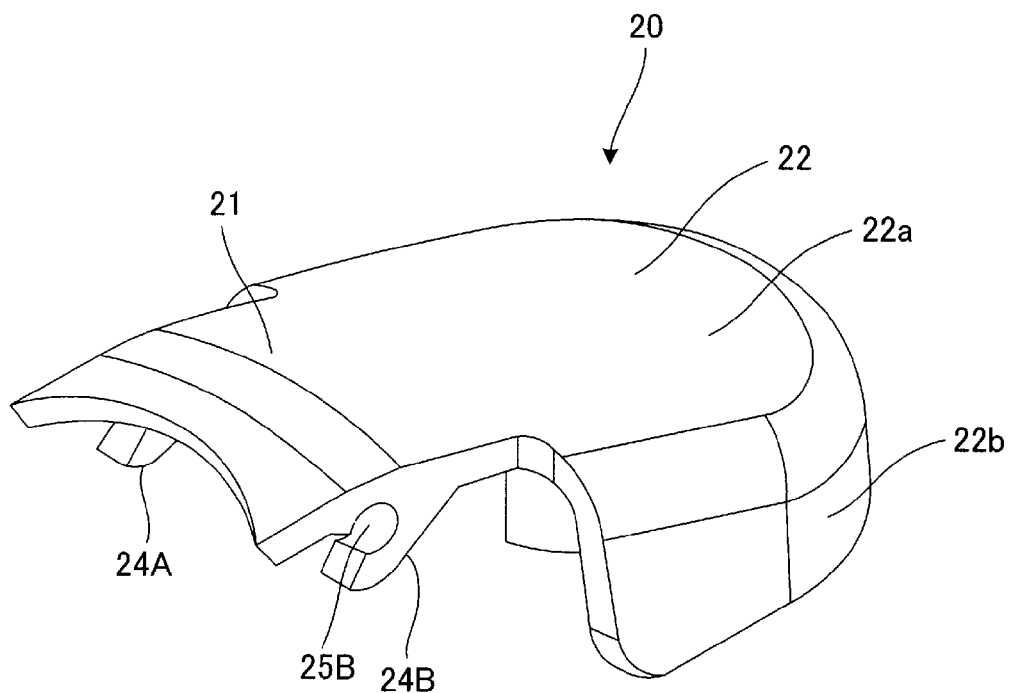
FIG. 9 is a perspective view showing the head cap in the embodiment.
Figure 10:
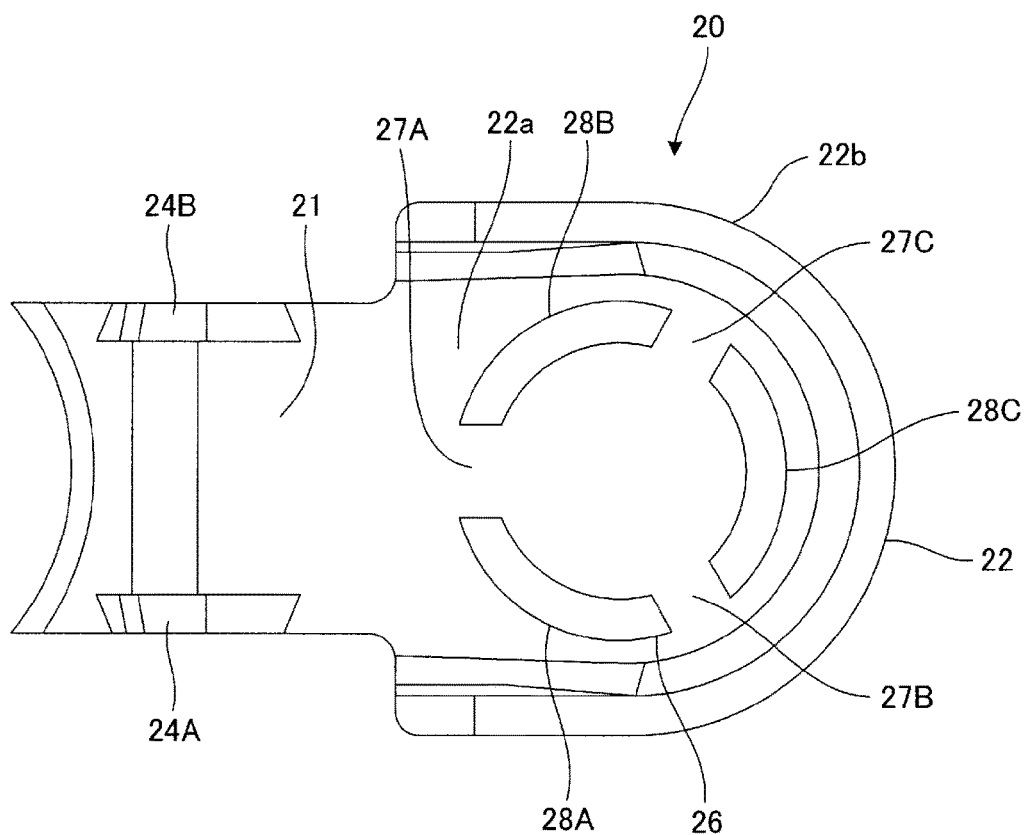
FIG. 10 is a bottom view showing the head cap in the embodiment.
Figure 11:
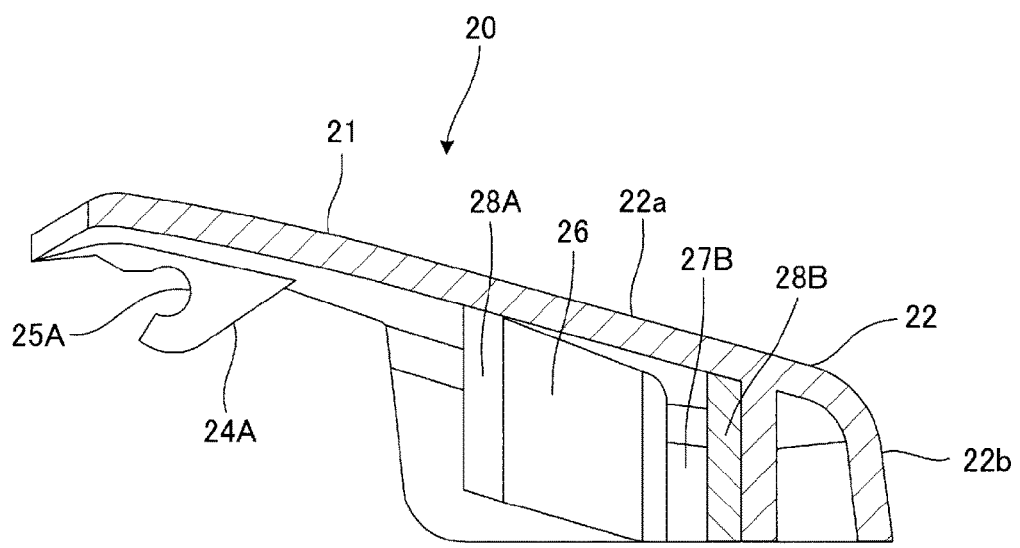
FIG. 11 is a side sectional view showing the head cap in the embodiment.

As shown in FIGS. 6 and 7, the arm head body 10 includes a bottom surface section 11 and sidewall sections 12A, 12B extending forwardly from the bottom surface section 11. A driving shaft hole 13 penetrating through the bottom surface section 11 in the vertical direction is formed in the bottom surface section 11. A driving shaft 8 for linking to a driving means (a driving motor), not shown in the drawings, penetrates through the driving shaft hole 13. A nut 9 as a fixing member is threaded into the upper end portion of the driving shaft 8 so that the driving shaft 8 is fixed to the bottom surface section 11. As will be explained in detail later, the nut 9 disposed on the bottom surface section 11 functions as an arm-head-body-side fitting section for fixing the head cap 20.

A coupling shaft 14 for coupling to the retainer 5 is disposed between the sidewalls 12A, 12B on both sides of the arm head body 10. The coupling shaft 14 is disposed adjacent to the front end of the arm head body 10. The proximal end portion of the retainer 5 is rotatably coupled to the coupling shaft 14.

Rotating shafts 15A, 15B having a protrusion shape are provided on the inner side surfaces of the sidewalls 12A, 12B on both sides (surfaces opposed to each other of the sidewalls 12A, 12B). The rotating shafts 15A, 15B extend in the lateral direction from the both side sidewalls 12A, 12B toward the inner side. The head cap 20 is rotatably attached to the rotating shafts 15A, 15B.

As shown in FIGS. 8 to 11, the head cap 20 is a cover member covering the upper side of the arm head body 10 and is composed of a front-side half section 21 and a rear-side half section 22. The front-side half section 21 is a plate-shaped portion having a lateral width substantially equal to an interval between the sidewalls 12A, 12B of the arm head body 10. On the other hand, the rear-side half section 22 is integrally formed behind the front-side half section 21 and includes an upper surface 22a including an arcuate rear end portion and a circumferential wall 22b extending downward from the circumferential edge of the upper surface 22a to surround a space below the upper surface 22a.

Fitting sections 24A, 24B extend downward on both sides of the front-side half section 21 of the head cap 20. Fitting concave sections 25A, 25B opened forward are respectively formed in the fitting sections 24A, 24B. The rotating shafts 15A, 15B of the sidewalls 12A, 12B are respectively fit in the fitting concave sections 25A, 25B, whereby the head cap 20 is rotatably attached to the arm head body 10. Consequently, the head cap 20 attached to the arm head body 10 can selectively take a closed position shown in FIG. 3 and an open position shown in FIG. 4.

When the head cap 20 is in a closed state, the front-side half section 21 of the head cap 20 is disposed between the both side sidewalls 12A, 12B of the arm head body 10. The rear-side half section 22 of the head cap 20 is disposed behind the both side sidewalls 12A, 12B. In a state in which the lower end of the circumferential wall 22b of the rear-side half section 22 is in contact with the bottom surface section 11, the rear-side half section 22 is disposed to surround a space on the upper side of the bottom surface section 11 of the arm head body 10.

On the rear surface (a surface facing downward) of the rear-side half section 22 of the head cap 20, a cap-side fitting section 26 having a substantially cylindrical shape opened to the lower side is protrudingly provided. The inner diameter of the cap-side fitting section 26 is formed substantially equal to the outer diameter of the nut 9 (the arm-head-body-side fitting section). Consequently, when the head cap 20 is in its closed position, the nut 9 (the arm-head-body-side fitting section) tightly fits in (is pressed into) the cap-side fitting section 26. As a result, the head cap 20 is surely fixed to the arm head body 10.

In the cap-side fitting section 26, a plurality of (in this embodiment, three) slits 27A, 27B, and 27C extending in the vertical direction over the entire length of the cap-side fitting section 26 are formed. As a result, the cap-side fitting section 26 is divided into three divided sections 28A, 28B, and 28C. Accordingly, when the nut 9 is pressed into the cap-side fitting section 26, the divided sections 28A, 28B, and 28C configuring the cap-side fitting section 26 are expanded toward the outer side. It is thus possible to smoothly fit the nut 9 in the cap-side fitting section 26.

The length in the vertical direction of the cap-side fitting section 27 decreases toward the forward direction (the rotating shafts 15A, 15B side). Namely, the divided sections 28A, 28B configuring the cap-side fitting section 27 are obliquely cut at the lower end portions so that the length in the vertical direction of the divided sections 28A, 28B decreases toward the forward direction. Consequently, when the head cap 20 is moved from the open position to the closed position, a front-side portion of the cap-side fitting section 26 is prevented from interfering with the nut 9 (the arm-head-body-side fitting section). It is thus possible to smoothly fit the nut 9 in the cap-side fitting section 26.

As explained above, with the arm head 4 of the wiper arm 2 in this embodiment, the head cap 20 is attached to the arm head body 10 to be capable of opening and closing and, when the head cap 20 is in its closed position, the front-side half section 21 of the head cap 20 is disposed between the sidewalls 12A, 12B on both sides of the arm head body 10. Accordingly, the entire side surface of the front-side portion of the arm head 4 is configured by the sidewalls 12A, 12B of the arm head body 10 having large mechanical strength so that the mechanical strength of the arm head 4 increases and the durability of the wiper arm 2 is improved. In addition, compared with a cover member covering the entire side surface of the arm head 4, the lateral width of the arm head 4 can be reduced.

Since the head cap 20 is rotatably attached to the rotating shafts 15A, 15B provided on the inner side of the sidewalls 12A, 12B of the arm head body 10, it is possible to easily open and close the head cap 20 without detaching the head cap 20 from the arm head body 10. Therefore, in the manufacturing process (manufacturing line) of the wiper assembly 1, the arm head body 10 and the head cap 20 can be treated as one member in which the arm head body 10 and the head cap 20 are combined. It is thus possible to easily perform works on the inside portion of the head cap 20 such as tightening of the nut 9 by opening and closing the head cap 20. Accordingly, it is possible to improve efficiency of the manufacturing process.

The fixing of the head cap 20 to the arm head body 10 is performed by the fitting of the cap-side fitting section 26 of the head cap 20 and the nut 9 (the arm-head-body-side fitting section) on the arm head body 10 side. Since the cap-side fitting section 26 of the head cap 20 includes the slits 27A, 27B and 27C, the cap-side fitting section 26 is expanded to the outer side during the fitting of the nut 9 in the cap-side fitting section 26. It is thus possible to smoothly press the nut 9 into the cap-side fitting section 26.

Since the cap-side fitting section 26 of the head cap 20 is formed so that the length in the vertical direction of the front-side portion (the portion on the rotating shafts 15A, 15B side) is shorten, the lower end of the front-side portion of the cap-side fitting section 26 does not interfere with the nut 9 (the arm-head-body-side fitting section) when the head cap 20 is moved toward its closed position. Accordingly, while the head cap 20 is surely fixed to the arm head body 10 by the fitting of the cap-side fitting section 26 and the nut 9 (the arm-head-body-side fitting section), it is possible to smoothly fit the nut 9 in the cap-side fitting section 26 when the head cap 20 is moved to its closed position.

LIST OF REFERENCE NUMERALS 1 wiper assembly
2 wiper arm
3 wiper blade
4 arm head
5 retainer
6 wiper blade body
7 coupling section
8 driving shaft
9 nut (arm-head-body-side fitting section)
10 arm head body
11 bottom surface section
12A, 12B sidewall
13 driving shaft hole
14 coupling shaft
15A, 15B rotating shaft
20 head cap
21 front-side half section
22 rear-side half section
22a upper surface
22b circumferential wall
24A, 24B fitting section
25A, 25B fitting concave section
26 cap-side fitting section
27A, 27B, 27C slit
28A, 28B, 28C divided section

The invention claimed is:

1. A wiper arm comprising an arm head associated to a driving means,
    said arm head including an arm head body and a cover member attached to said arm head body rotatable around a rotating shaft between an open position and a closed position,
    said arm head body including sidewalls on both sides,
    said cover member including a front-side half section and a rear-side half section,
    wherein said front-side half section is disposed between the sidewalls of said arm head body when said cover member is in said closed position, said front-side-half section being a plate-shaped portion having a lateral width substantially equal to an interval between said sidewalls of said arm head body,
    wherein the wiper arm includes a cover member-side fitting section disposed on a rear surface of said cover member and an arm-head-body-side fitting section disposed on said arm head body side,
    wherein when said cover member is in said closed position, said cover member-side fitting section and said arm-head-body-side fitting section fit with each other so that said cover member is fixed to said arm head body,
    wherein said arm-head-body-side fitting section is a nut attached to a driving shaft of said driving means,
    wherein said cover member-side fitting section extends downward from the cover member and has a cylindrical shape arranged to fit to said nut, wherein said cover member-side fitting section has a longitudinal length, and wherein the longitudinal length of said cover member-side fitting section is shortened on the rotating shaft side.

2. The wiper arm according to claim 1, wherein said rotating shaft is provided on each of inner side surfaces of the sidewalls.

3. The wiper arm according to claim 1, wherein said arm-head-body-side fitting section is a fixing member for fixing a driving shaft of said driving means to said arm head body.

4. The wiper arm according to claim 1, wherein slits extending over the entire length of the cylindrical shape are formed in said cover member-side fitting section.

\* \* \* \* \*